Feb. 22, 1966 W. W. KREFT 3,236,198
PORTABLE INCINERATOR
Filed Aug. 26, 1963 3 Sheets-Sheet 3

INVENTOR.
WALTER W. KREFT
BY Rudolph L. Lowell
ATTORNEY.

United States Patent Office 3,236,198
Patented Feb. 22, 1966

3,236,198
PORTABLE INCINERATOR
Walter W. Kreft, 1004 Early St., Sac City, Iowa
Filed Aug. 26, 1963, Ser. No. 304,374
6 Claims. (Cl. 110—19)

This invention relates to a hand drawn vehicle and more particularly to a two-wheeled cart having a box and a receptacle for the collection and burning of combustible bulk material.

It is the object of this invention to provide an improved portable combination incinerator and cart.

Another object of the invention is to provide an incinerator cart which is readily moved from one location to another, with a combustion cage spaced above the ground and fixed to a heating insulating platform.

A further object of the invention is to provide a combination incinerator and cart which may be used for burning combustible materials and converted into a cart for hauling bulk material.

Still another object of the invention is to provide a portable incinerator cart with a heat shield which insulates the surface of the ground from the heat of burning material in the incinerator so as to enable the cart to be used on a lawn to burn leaves without injuring the lawn grasses.

An additional object of the invention is to provide a mobile and convenient handling cart which is sturdy in construction and economical in cost.

These and other objects and advantages of this invention will become readily apparent upon reference to the following description and accompanying drawings, wherein:

FIG. 5 is an enlarged sectional view taken along the line 5—5 of FIG. 1 showing a peripheral section of the bottom wall; and FIG. 6 is a perspective view of the cart of FIG. 1 with the wire incinerator cage removed.

Figure 1:
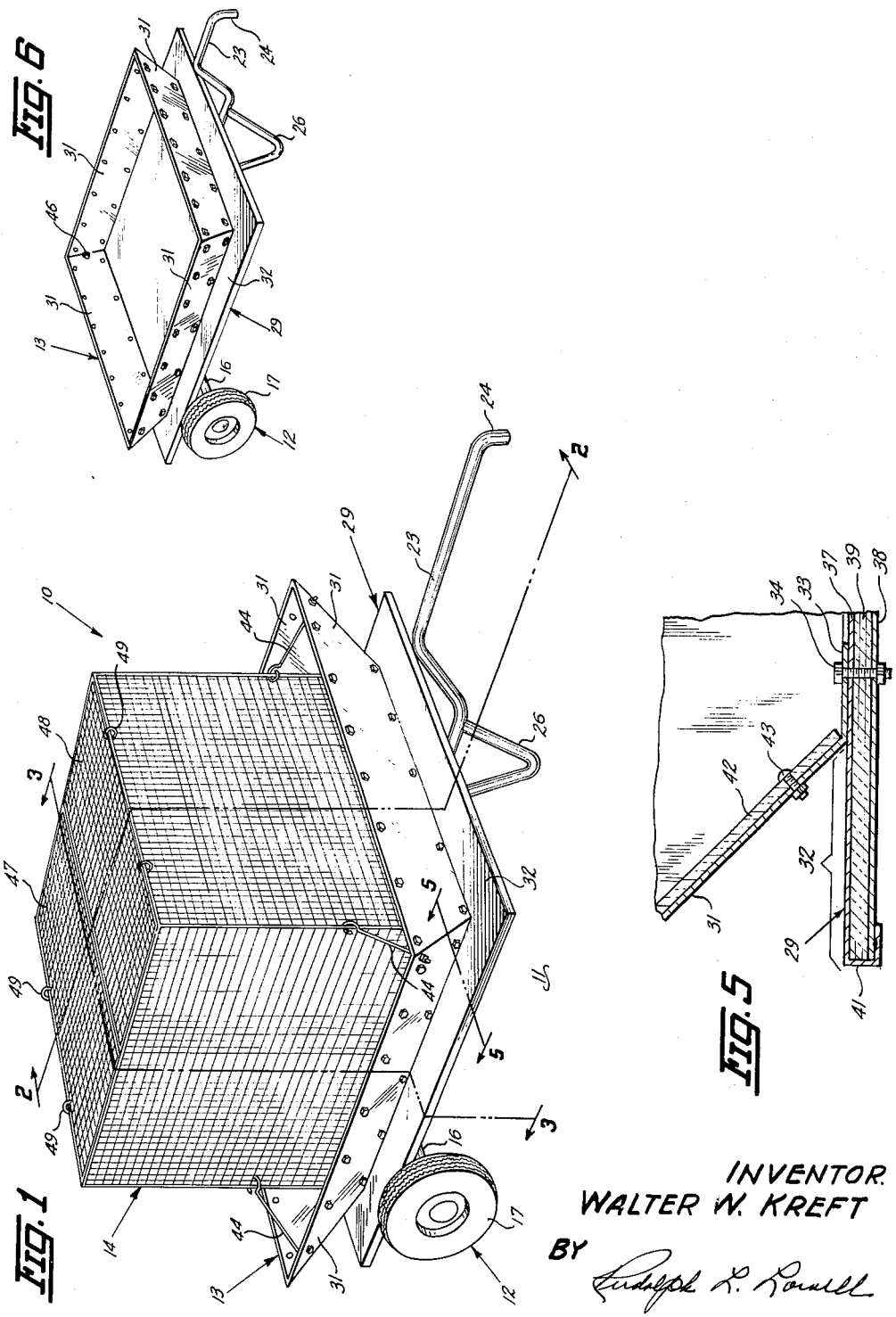
FIG. 1 is a perspective view of the incinerator cart embodying the invention.

Referring to the drawing, there is shown in FIG. 1 an incinerator cart 10, standing on a support surface 11, such as a lawn. The cart 10 comprises a two-wheeled truck assembly 12 and a box unit 13 mounted on the truck assembly. Carried withint he box unit 13 is a rectangular wire cage 14 which forms with the box unit a reecptacle for the collection and the burning of combustible material, such as leaves, weeds, twigs and other related trash.

Figure 2:
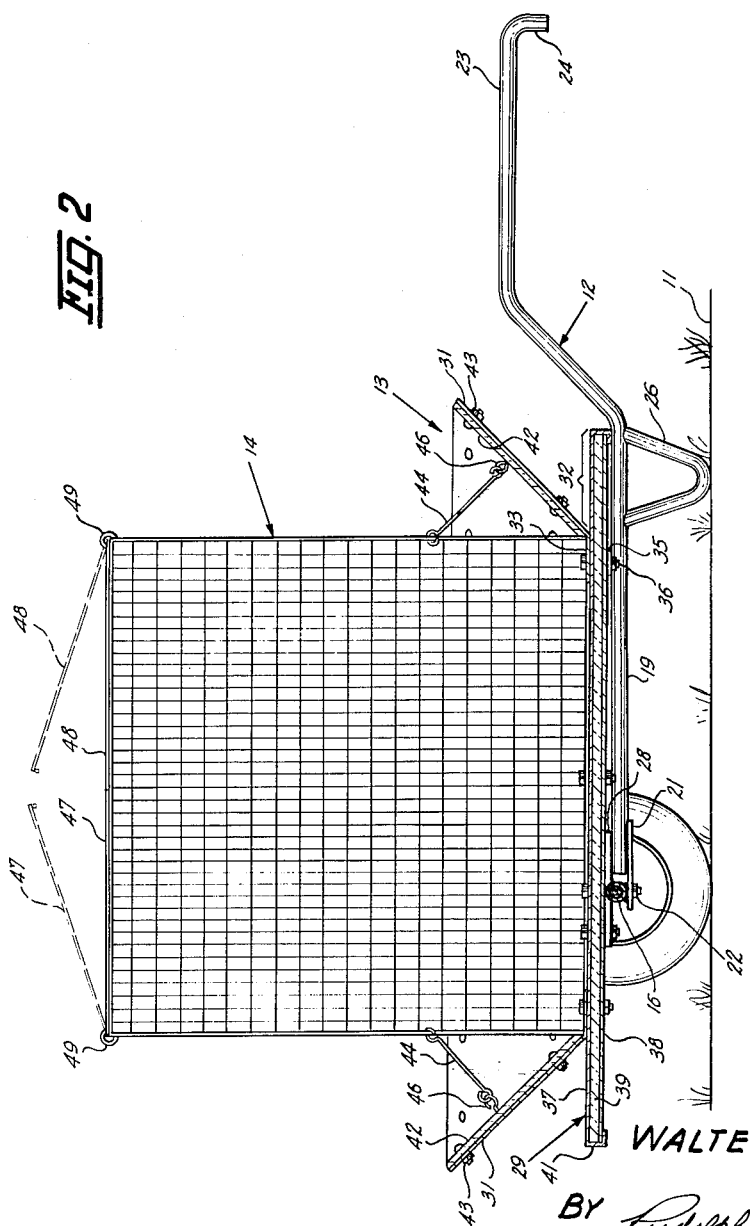
FIG. 2 is an enlarged sectional view taken along the line 2—2 of FIG. 1.
Figure 3:
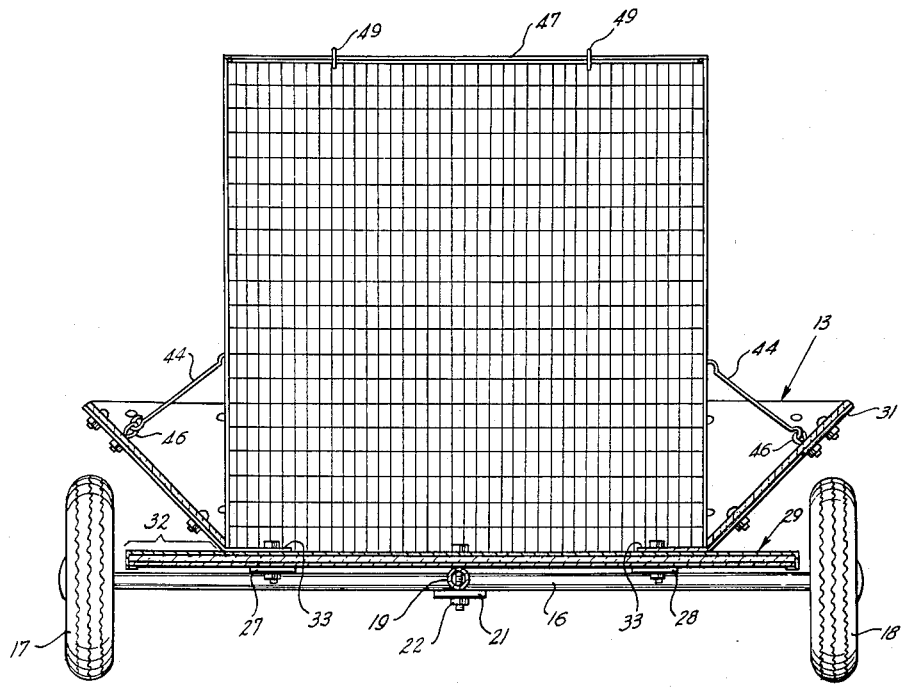
FIG. 3 is an enlarged sectional view taken along the line 3—3 of FIG. 1.
Figure 4:
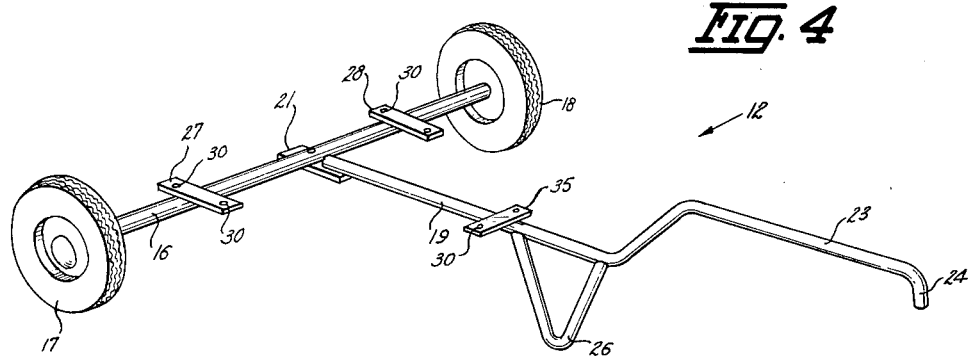
FIG. 4 is a perspective view of the truck assembly of the cart shown in FIG. 1.

As shown in FIGS. 2, 3, and 4, the truck assembly 12 comprises a transverse tubular axle 16. Rotatably mounted on the opposite ends of the axle 16 are wheels 17 and 18. In order to enhance the appearance of the cart and reduce its weight, the wheels 17 and 18 are provided with hard rubber tires. Secured to the midsection of the axle 16 is a longitudinal tubular tongue 19. The rear section of the tongue 19 has secured to the lower side thereof a plate 21 which is positioned under the axle 16. A bolt 22 extends through the bottom of the box unit 13, the axle 16, and plate member 21, thereby fastening the tongue 19 to the axle 16. The forward section of the tongue 19 extends in an upward and forward direction and terminates in a horizontal handle 23. The end 24 of the handle is turned down to form a hand stop.

Secured to the midsection of the tongue 19 is a downwardly extended U-shaped leg 26. The upper ends of the leg 26 are secured to the bottom of the tongue 19. The leg 26 is of a length so that when the bottom of the leg engages the support surface 11, the tongue 19 is held in a substantially horizontal position.

Secured to the top of the axle 16, on opposite sides of the tongue 19, are a pair of plate members 27 and 28. As shown in FIG. 4, the plate members 27 and 28 extend in a horizontal direction on each side of the axle 16. The end sections of each plate have holes 30 for receiving bolts. Also as shown in FIGS. 2 and 4 a plate member 35 is attached to the top of the tongue section 19 and extends transversely thereof.

A box unit 13 is carried by the truck assembly 12 and comprises a flat bottom wall or platform 29 and upwardly flared side walls or flange means 31. The peripheral section 32 of the bottom wall 29 projects laterally outwardly from the bottom edge of the flared side walls. The bottom edges of the side walls 31 terminate in inwardly extended flanges 33 which engage the top surface of the bottom wall 29. Bolts 34 extend through the flanges 33, the bottom wall 29, and the plate members 27 and 28 thereby securing the side walls 31 to the bottom wall 29 and securing the box unit 13 to the truck assembly 12. As shown in FIG. 2, bolts 36 extend through the flange 33, the bottom wall 29 and the plate member 35 to connect the forward portion of the box unit 13 to the truck assembly 12.

The bottom wall 29 has a rectangular shape and is a laminated structure comprising a sheet metal top layer 37, and a sheet metal bottom layer 38. Heat insulating material 39, such as a plurality of layers of asbestos, is sandwiched between the top and bottom sheet metal layers. As best shown in FIG. 5, the peripheral edge 41 of the top sheet metal layer 37, is turned down under the bottom layer 38 and functions to clamp the heat insulating material 39 between the top and bottom layers. The portion of the peripheral edge 41 of the top layer engaging the bottom layer 38 may be secured to the bottom layer by spot welds.

As shown in FIG. 1, the flared side walls 31 extend around the wire cage 14 and are directed in an upward and outward direction from the top surface of the bottom wall 29. The peripheral section 32 of the bottom wall is positioned between the outside surface of the side walls 31 and the cart supporting surface 11. The inner surfaces of the side walls have an insulating cover 42, such as asbestos. This cover is secured to the sheet metal side walls 31 by spaced bolts 43.

The wire cage 14 is positioned on the box unit 13 with the bottom edge of the cage resting on the flanges 33. As shown in FIGS. 2 and 3, the cage 14 is held in an upright position by wire hooks 44 which are connected at one end to eye bolts 46 fastened to the corners of the side walls 31 and fastened at the opposite end to the corners of the wire cage 14. The hooks 44 project in an upward direction and function to apply a downward and outward force on the cage to firmly hold the cage in an upright position.

The cage 14 is of a wire mesh construction which may be of any desired size. Preferably the wire mesh is relatively large to avoid excessive weight and to afford uninhibited air circulation. Alternatively, the wire mesh should not be so large as to accommodate escape of leaves or make the side walls of the cage structurally weak. By way of example, the cage 14 may be formed from Sheffield Aluminized Wire having a mesh size of three-fourths of an inch by one and one-half inches.

In order to confine the combustion of the leaves to the cage 14, a pair of identical wire mesh doors 47 and 48 are positioned over the top of the cage 14. The doors 47 and 48 are hinged to opposite sides of the cage by wire loops 49.

When it is desired to burn leaves or trash, the cart is wheeled to a desired location. With one or both of the doors 47 and 48 open, leaves are placed in the wire cage 14. When a sufficient amount of leaves are in the cage, the doors 47 and 48 are closed and the leaves ignited. The combustion of the leaves will be confined to the cage 14 because the size of the wire mesh does not permit the burning leaves from rising out of the cage. The heat generated by the burning leaves is confined to the box unit and cage and thus does not scorch or burn the grass in the area surrounding the cart. The heat insulating material 39, in the bottom wall 29, functions as a shield which minimizes the heat transfer in a downward direction. The peripheral portion 32 of the bottom wall 29 which extends outwardly from the side walls 13 reflects radiated heat upwardly. The heat-insulating cover 42 on the inside surfaces of the side walls 31, shields the side walls from the heat of the burning leaves and minimizes the heat transfer in an outward direction.

It is apparent that the cart can be moved from location to location as desired. The incinerator cart 10 does not have a tendency to tip because the wheels 17 and 18 are positioned rearwardly in the center line of the box unit 13 and the leg 16 extends downwardly from the forward edge of the bottom wall 29. The stability of the cart is further enhanced by the triangular relationship between the wheels 17 and 18 and the leg 26.

As shown in FIG. 6, when the wire cage has been removed from the box unit 13, the cart 10 may be used as a general utility cart. The wire cage 14 is removed by merely unhooking the wire hooks 44 from the eye bolts 46 and lifting the cage from the box unit.

While there have been shown, described, and pointed out the fundamental novel features of the invention, it is to be understood that various omissions, substitutions, changes in form, and details of the apparatus illustrated may be made by those skilled in the art, without departing from the spirit of the invention. It is intended to be limited only as indicated by the scope of the following claims.

I claim:
1. An incinerator cart comprising
 (a) a truck assembly having a transverse axle, wheels rotatably mounted on the opposite ends of said axle, and a longitudinal tongue secured to the axle intermediate said wheels, said tongue including a downwardly extended leg section and an upwardly and forwardly extended handle section,
 (b) a flat platform secured to said axle and tongue, said platform being of a laminated construction having a plurality of layers of insulative material sandwiched between a top metal sheet and a bottom metal sheet,
 (c) flange means secured to said platform inwardly from the peripheral edges thereof, said flange means extended upwardly and outwardly from said platform whereby said platform is positioned between the sides of said flange means and the cart supporting surface,
 (d) heat insulating means secured to the inside surfaces of said flange means,
 (e) upright wire cage means supported on said platform within the area defined by said flange means, and
 (f) means securing the wire cage means to said flange means to hold the cage means in an upright position.

2. An incinerator cart comprising
 (a) a truck assembly having a transverse axle, wheels rotatably mounted on the opposite ends of said axle, and a longitudinal tongue secured to the axle intermediate said wheels, said tongue including a downwardly extending leg section and a forwardly extended handle section.
 (b) a platform secured to said axle and tongue, said platform being of a laminated construction having insulative material sandwiched between a top member and a bottom member,
 (c) flange means secured to said platform inwardly from the peripheral edges thereof, said flange means extended upwardly from said platform,
 (d) upright wire cage means supported on said platform within the area defined by said flange means, and
 (e) means securing the wire cage means to said flange means to hold the cage means in an upright position.

3. An incinerator cart comprising
 (a) a truck assembly having a transverse axle, wheels rotatably mounted on the opposite ends of said axle, and a longitudinal tongue secured to the axle intermediate said wheels, said tongue including a downwardly extended leg section and an upwardly and forwardly extended handle section,
 (b) a platform secured to said axle and tongue, said platfrom having a top sheet, a bottom sheet, and insulative material positioned between said top sheet and bottom sheet,
 (c) flange means secured to said platform and extended upwardly therefrom,
 (d) upright wire cage means supported on said platform within the area defined by said flange means, and
 (e) means securing the wire cage means to said flange means to hold the cage means in an upright position.

4. An incinerator cart comprising:
 (a) a frame assembly having a transverse axle,
 (b) wheels mounted on said axle,
 (c) a tongue means secured to and extended forwardly from said axle,
 (d) a ground engageable supporting leg on said tongue means,
 (e) an upwardly and forwardly extended handle section secured to said tongue means,
 (f) a platform secured to said axle and tongue means,
 (g) an upright continuous shield means secured to said platform inwardly from the peripheral edge thereof, said shield means inclined upwardly and outwardly from said platform, and
 (h) container means supported on said platform within the area defined by said shield means whereby heat generated within said container means is reflected upwardly by said shield means and said platform.

5. An incinerator cart comprising:
 (a) a frame assembly including a wheel and axle unit, a handle and tongue means secured to and extended forwardly from said unit, and a ground engageable supporting leg on said said handle and tongue means,
 (b) a box assembly including a bottom wall secured to said frame assembly,
 (c) upwardly and outwardly inclined side walls secured to said bottom wall at positions spaced inwardly from the peripheral edge of said bottom wall, and
 (d) container means supported on said bottom wall within the area defined by said side walls whereby heat generated within said container means is deflected upwardly by said bottom wall and side walls.

6. An incinerator cart as defined in claim 5, in which:
(a) said bottom wall and side walls have a layer of heat insulative material secured thereto.

References Cited by the Examiner

UNITED STATES PATENTS

| | | | |
|---|---|---|---|
| 876,180 | 1/1908 | Hemenway et al. | 110—19 |
| 1,338,125 | 4/1920 | Dolen | 110—19 |
| 1,338,144 | 4/1920 | McNeill. | |
| 1,355,249 | 10/1920 | Nottingham. | |
| 2,607,334 | 8/1952 | Perlman | 126—25 X |
| 2,768,022 | 10/1956 | Pope | 110—19 |
| 2,851,941 | 9/1958 | Cogar | 126—25 X |
| 2,882,842 | 4/1959 | Royer | 110—18 |

JAMES W. WESTHAVER, *Primary Examiner.*

FREDERICK L. MATTESON, Jr., *Examiner.*

H. B. RAMEY, *Assistant Examiner.*